US009733921B1

(12) United States Patent
Saenz et al.

(10) Patent No.: US 9,733,921 B1
(45) Date of Patent: Aug. 15, 2017

(54) SYSTEM AND METHODS FOR MANAGEMENT OF CLOUD APPLICATION EXTENSIONS

(71) Applicant: NetSuite Inc., San Mateo, CA (US)

(72) Inventors: Mariano Nestor Saenz, San Carlos, CA (US); Douglas H. Williams, Capitola, CA (US); Elham Ghassemzadeh, San Jose, CA (US); Suhas R. Mehta, Santa Clara, CA (US)

(73) Assignee: NetSuite Inc., San Mateo, CA (US)

( * ) Notice: Subject to any disclaimer, the term of this patent is extended or adjusted under 35 U.S.C. 154(b) by 0 days.

(21) Appl. No.: 14/602,902

(22) Filed: Jan. 22, 2015

Related U.S. Application Data

(60) Provisional application No. 61/930,838, filed on Jan. 23, 2014, provisional application No. 61/991,258, filed on May 9, 2014.

(51) Int. Cl.
  G06F 9/44 (2006.01)
  G06F 9/445 (2006.01)
  G06F 11/36 (2006.01)

(52) U.S. Cl.
  CPC ............ *G06F 8/65* (2013.01); *G06F 8/60* (2013.01); *G06F 11/3672* (2013.01)

(58) Field of Classification Search
  CPC ........... G06F 8/65; G06F 8/60; G06F 11/3672
  USPC ......................................................... 717/171
  See application file for complete search history.

(56) References Cited

U.S. PATENT DOCUMENTS

| | | | |
|---|---|---|---|
| 6,871,345 B1* | 3/2005 | Crow et al. ................... | 717/175 |
| 7,865,889 B1* | 1/2011 | Bird et al. ..................... | 717/168 |
| 8,849,887 B2* | 9/2014 | Rajan et al. ................... | 709/201 |
| 8,880,678 B1* | 11/2014 | Colton et al. ................. | 709/224 |
| 8,881,129 B1* | 11/2014 | McKinnon et al. ........... | 717/168 |
| 2004/0060044 A1* | 3/2004 | Das et al. ...................... | 717/171 |
| 2005/0268297 A1* | 12/2005 | Kovachka-Dimitrova et al. ............................ | 717/171 |
| 2008/0201701 A1* | 8/2008 | Hofhansl et al. ............. | 717/168 |
| 2009/0210921 A1* | 8/2009 | Ramsdell ....................... | 725/120 |
| 2010/0115401 A1* | 5/2010 | Nordine et al. ............... | 715/255 |
| 2010/0293541 A1* | 11/2010 | Pall et al. ...................... | 717/178 |
| 2010/0299664 A1* | 11/2010 | Taylor ............... G06F 17/30377 717/173 |  |
| 2010/0318969 A1* | 12/2010 | Petrovicky et al. ........... | 717/124 |
| 2012/0030168 A1* | 2/2012 | Weissenberger ....... G06Q 10/00 707/611 |  |
| 2012/0047492 A1* | 2/2012 | Huang et al. ................. | 717/128 |
| 2012/0101998 A1* | 4/2012 | Cahill ............... G06F 17/30356 707/654 |  |

(Continued)

*Primary Examiner* — Lewis A Bullock, Jr.
*Assistant Examiner* — Theodore Hebert
(74) *Attorney, Agent, or Firm* — Lane Powell PC

(57) ABSTRACT

Systems, apparatuses, and methods for managing the deployment of extensions to the functionality of a multi-tenant data processing platform. A computing system, such as a multi-tenant distributed computing platform, may have multiple business related applications installed on the platform that are used by one or more users/tenants to perform business related functions. Developers may create and implement "extensions" to such applications, and make those extensions available to tenants/users of the platform. Such extensions may provide an enhancement to the underlying application, such as by introducing new or improved functionality, a new or improved user interface, new or improved reporting capabilities, etc.

13 Claims, 7 Drawing Sheets

(56) References Cited

U.S. PATENT DOCUMENTS

| | | | |
|---|---|---|---|
| 2012/0137272 A1* | 5/2012 | Kemmler et al. | 717/124 |
| 2012/0317621 A1* | 12/2012 | Mihara | G06F 21/6218 |
| | | | 726/4 |
| 2013/0024841 A1* | 1/2013 | Agarwal | 717/124 |
| 2013/0139126 A1* | 5/2013 | Archer et al. | 717/121 |
| 2013/0185603 A1* | 7/2013 | Parra et al. | 714/48 |
| 2014/0075431 A1* | 3/2014 | Kumar et al. | 717/175 |
| 2014/0075501 A1* | 3/2014 | Srinivasan | G06F 21/62 |
| | | | 726/1 |
| 2014/0282413 A1* | 9/2014 | Grimme et al. | 717/124 |
| 2015/0178065 A1* | 6/2015 | Valkov et al. | G06F 8/65 |
| 2015/0199197 A1* | 7/2015 | Maes et al. | G06F 8/71 |

\* cited by examiner

SYSTEM AND METHODS FOR MANAGEMENT OF CLOUD APPLICATION EXTENSIONS

CROSS REFERENCE TO RELATED APPLICATIONS

This application claims the benefit of U.S. Provisional Application No. 61/930,838, entitled "Phased Release of Cloud Application Extensions," filed Jan. 23, 2014, which is incorporated by reference herein in its entirety (including Appendix) for all purposes. This application also claims the benefit of U.S. Provisional Application No. 61/991,258, entitled "System and Method for Managing Release of Extension to Cloud-Based Application," filed May 9, 2014, which is incorporated by reference herein in its entirety (including Appendix) for all purposes.

BACKGROUND

A cloud-based data processing platform may be used to provide business users with access to business related data processing applications and data. Typically, such platforms are operated by a third party and provide data storage and data processing services to multiple users using what is termed a multi-tenant architecture. The provided services may be based on business related applications, including but not limited to Enterprise Resource Planning (ERP), Customer Relationship Management (CRM), eCommerce, Financial, or Human Resources related applications. The data storage and business related applications may be provided to users in the form of a Software-as-a-Service (SaaS) business model. Such a data processing platform is typically comprised of multiple servers that are capable of running one or more of the business related data processing applications. The platform may thus provide a system or suite of functionality that is used by multiple tenants to provide benefits to their respective users (which may be employees of a tenant, customers of a tenant, etc.).

Enterprise Resource Planning (ERP) applications typically integrate the capabilities of several historically separate business computing systems into a common system, with a view toward streamlining business processes and increasing efficiencies on a business-wide level. The capabilities or modules of an ERP system may include (but are not required to include, nor limited to only including): accounting, order processing, time and billing, inventory management, employee management/payroll, human resources management, and employee calendaring and collaboration, as well as reporting and analysis capabilities relating to these functions.

Customer Relationship Management (CRM) applications typically include (but are not required to include, nor limited to only including): sales force automation (SFA), marketing automation, contact list, call center support, and web-based customer support, as well as reporting and analysis capabilities relating to these functions. With differing levels of overlap with ERP/CRM initiatives and with each other, efforts have also been directed toward development of increasingly integrated partner and vendor management systems, web store/eCommerce systems, product lifecycle management (PLM) systems, and supply chain management (SCM) systems.

In an effort to permit tenants to access the services and functionality that they desire (which may include providing certain services to their end customers, such as an eCommerce platform), a multi-tenant service platform may permit a tenant to configure certain aspects of the available service(s) to better suit their business needs. In this way the service platform may be customizable, and thereby enable a tenant to configure the platform to provide distinctive services to their respective users or to groups of those users. For example, a business enterprise that uses the service platform may want to provide additional functions or capabilities to their employees and/or customers, or to cause their business data to be processed in a specific way in accordance with a defined workflow that is tailored to their business needs, etc.

Tenant customizations may include custom functionality (such as the capability to perform tenant or user-specific functions, data processing, or operations) built on top of lower level operating system functions. Some multi-tenant service platforms may offer the ability to customize functions or operations at a number of different levels of the service platform, from aesthetic modifications to a graphical user interface to providing integration of components and processes, and/or entire applications developed by independent third party vendors. This can be very beneficial, since by permitting use of components, processes, and/or applications developed by others, a multi-tenant service can significantly enhance the functionality available to tenants and increase tenant satisfaction with the platform. In some cases, one or more of the customizations may be packaged into a logical functional group to create an application "extension" that includes a set of customizations that may be beneficial to utilize together or are desired by a particular tenant/user.

In addition to service platform or tenant/user developed customizations, a $3^{rd}$ party software developer may also create an extension to a particular application or service that is available to users through a multi-tenant data processing platform. In one example, the extension may add new functionality or capabilities to the underlying application. In some cases one or more tenants/users of the platform may wish to add the extension to their use of the underlying application in order to be able to utilize the enhancements to the application that are made possible by the extension. Further, the developer may wish to upgrade or provide a patch to the extension as they recognize a need for fixes or additional functionality that would be beneficial to incorporate into the extension. However, in some cases the developer may prefer to make the upgrade available to only a select set of users (at least initially) in order to obtain feedback for improving the newer version of the extension, to test the stability of the extension, or to assist them to segment the market for their extension(s). Because the specific extension release or upgrade path for a tenant may depend on the tenant/account involved and its status, and to prevent harmful interactions with a tenant account, control and administration of the path is an important aspect of how a multi-tenant platform interacts with tenant accounts to make extensions available to them.

Conventional approaches to managing the release or upgrade of extensions to applications in a multi-tenant platform environment suffer from disadvantages related to lack of sufficient control over the processes and administration of the upgrades. Embodiments of the invention are directed toward solving these and other problems individually and collectively.

SUMMARY

The terms "invention," "the invention," "this invention" and "the present invention" as used herein are intended to refer broadly to all of the subject matter described in this document and to the claims. Statements containing these terms should be understood not to limit the subject matter described herein or to limit the meaning or scope of the claims. Embodiments of the invention covered by this patent are defined by the claims and not by this summary. This summary is a high-level overview of various aspects of the invention and introduces some of the concepts that are further described in the Detailed Description section below. This summary provides an overview of various aspects of the inventive methods and systems for providing a solution to some of the problems posed by current approaches to the management of a phased upgrade or roll-out of an extension to an application resident on a cloud-based platform. This summary is not intended to identify key, required, or essential features of the claimed subject matter, nor is it intended to be used in isolation to determine the scope of the claimed subject matter. The subject matter should be understood by reference to appropriate portions of the entire specification of this patent, to any or all drawings, and to each claim.

Embodiments of the invention are directed to a system, apparatuses, and methods for managing the deployment of extensions to the functionality of a multi-tenant data processing platform as well as for enabling a developer to manage a phased upgrade path or roll-out of an extension that provides an enhancement to the functionality of an application residing on a multi-tenant computing platform. In one embodiment, a developer of an extension may access a user interface and use that interface to select which users will be entitled to a newer version of an extension, and how those users will be provided with the extension and communications regarding the extension. In one embodiment, the invention may be used to manage the release of an extension or an upgrade to an extension of an application resident on the platform in a manner that can be controlled with regards to the recipients of the extension or upgrade without impacting other users of the platform.

In one embodiment, the invention is directed to a multi-tenant data processing system, where the system includes:
  one or more business related data processing applications installed in the system and accessible by a plurality of tenants of the multi-tenant data processing system;
  a data storage element accessible by a plurality of tenants of the multi-tenant data processing system; and
  a platform extension manager operable to permit a user to control a process for an extension to an element of the multi-tenant data processing system, the platform extension manager configured to
    generate a user interface configured to receive an identification of an extension or an upgrade to an extension to the element of the multi-tenant data processing system from the user;
    receive from the user a selection of an action to be applied to the extension or to the upgrade to the extension;
    receive from the user an identification of one or more accounts associated with one or more tenants of the multi-tenant data processing system to which the selected action is to be applied;
    perform one or more validation tests as needed to determine the acceptability of the extension or the upgrade to the extension for the selected action;
    based on the identified extension or the upgrade to the extension, determine a status of the extension or upgrade with regards to each of the one or more identified user accounts;
    determine a deployment process operable to achieve the selected action for the extension or for the upgrade; and
    operate to implement the deployment process upon receipt of a command from the user.

In another embodiment, the invention is directed to an apparatus for operating a multi-tenant data processing system, where the apparatus includes:
  an electronic data processing element;
  a set of instructions stored on a non-transient medium and executable by the electronic data processing element, which when executed cause the apparatus to
    generate a user interface configured to receive an identification of an extension or an upgrade to an extension to an element of the multi-tenant data processing system from the user;
    receive from the user a selection of an action to be applied to the extension or to the upgrade to the extension;
    receive from the user an identification of one or more accounts associated with one or more tenants of the multi-tenant data processing system to which the selected action is to be applied;
    perform one or more validation tests as needed to determine the acceptability of the extension or the upgrade to the extension for the selected action;
    based on the identified extension or the upgrade to the extension, determine a status of the extension or upgrade with regards to each of the one or more identified user accounts;
    determine a deployment process operable to achieve the selected action for the extension or for the upgrade; and
    operate to implement the deployment process upon receipt of a command from the user.

In yet another embodiment, the invention is directed to a method of operating a multi-tenant data processing system, where the method includes:
  providing a platform extension manager operable to permit a user to control a process for an extension to an element of the multi-tenant data processing system, the platform extension manager configured to
    generate a user interface configured to receive an identification of an extension or an upgrade to an extension to the element of the multi-tenant data processing system from the user;
    receive from the user a selection of an action to be applied to the extension or to the upgrade to the extension;
    receive from the user an identification of one or more accounts associated with one or more tenants of the multi-tenant data processing system to which the selected action is to be applied;
    perform one or more validation tests as needed to determine the acceptability of the extension or the upgrade to the extension for the selected action;
    based on the identified extension or the upgrade to the extension, determine a status of the extension or upgrade with regards to each of the one or more identified user accounts;
    determine a deployment process operable to achieve the selected action for the extension or for the upgrade; and
    operate to implement the deployment process upon receipt of a command from the user.

Other objects and advantages of the present invention will be apparent to one of ordinary skill in the art upon review of the detailed description of the present invention and the included figures.

BRIEF DESCRIPTION OF THE DRAWINGS

Various embodiments in accordance with the present disclosure will be described with reference to the drawings, in which.

Note that the same numbers are used throughout the disclosure and figures to reference like components and features.

DETAILED DESCRIPTION

Figure 1:
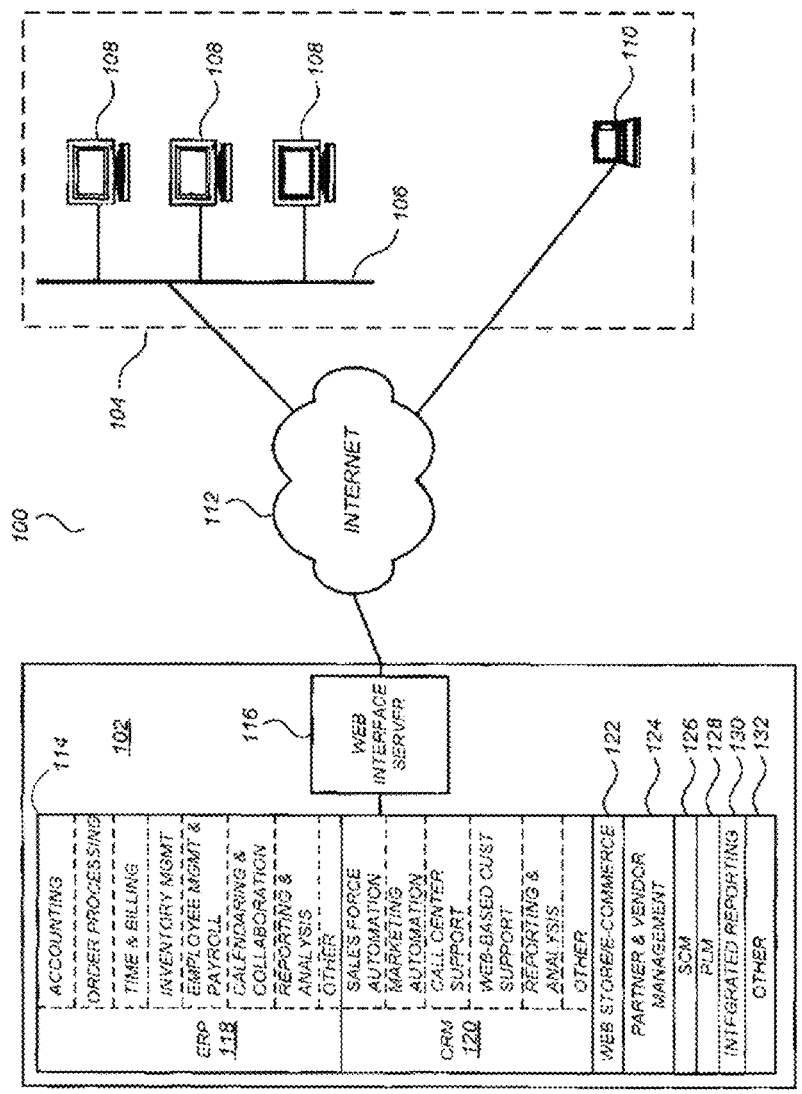
FIG. 1 is a diagram illustrating an example computing environment 100 in which an embodiment of the invention may be implemented.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the invention will be described more fully hereinafter with reference to the accompanying drawings, which form a part hereof, and which show, by way of illustration, exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art.

Among other things, the present invention may be embodied in whole or in part as a system, as one or more methods, or as one or more devices. Embodiments of the invention may take the form of an entirely hardware implemented embodiment, an entirely software implemented embodiment or an embodiment combining software and hardware aspects. For example, in some embodiments, one or more of the operations, functions, processes, or methods described herein may be implemented by a suitable processing element (such as a processor, microprocessor, CPU, controller, etc.) that is part of a server, computing device, network element, or data processing apparatus/platform and that is programmed with a set of executable instructions (e.g., software instructions), where the instructions may be stored in a suitable data storage element. The following detailed description is, therefore, not to be taken in a limiting sense.

Embodiments of the invention are directed to systems, apparatuses, and methods for managing the deployment of extensions to the functionality of a multi-tenant data processing platform. In accordance with at least one embodiment of the invention, a computing system, such as a multi-tenant distributed computing platform, may have multiple business related applications installed on the platform that are used by one or more users/tenants to perform business related functions. Developers may create and implement "extensions" to such applications, and make those extensions available to tenants/users of the platform. Such extensions may provide an enhancement to the underlying application, such as by introducing new or improved functionality, a new or improved user interface, new or improved reporting capabilities, etc. The developer of an extension may desire to continue developing the extension and/or correcting problems that users encounter when using the extension, and thus be working on more than a single version of an extension at one time. This creates a need to be able to manage the deployment/roll-out of different versions of the extension so that the newer version can be properly field tested, made available to only a sub-set of users due to license terms, etc.

In one embodiment, the invention may be used to manage the release of an extension or an upgrade to an extension of an application resident on the platform in a manner that can be controlled with regards to the recipients of the extension or upgrade without impacting other users of the platform. Embodiments of the invention provide an ability to dynamically change the release definition without incurring system down time. In this regard, once a revised or new release definition is saved, it becomes operative for any new upgrades from that time onward. Embodiments of the invention allow for phased-release of extensions to cloud-based applications, and permit dynamically changing the release upgrade definition to change how the extension or an upgrade to the extension will be released from then on. Embodiments also provide a mechanism for an automatic rollback of the release process to a previous stable version of the extension/upgrade, in case an error is encountered during the release process.

Embodiments of the invention enable tenant users to install additional functionalities in the form of extensions that may be provided by $3^{rd}$ party vendors, where such extensions may be delivered into the tenant/customer platform accounts. The invention provides a mechanism to update these accounts transparently and seamlessly with the new revisions (e.g., new functionalities or bug-fixes) without interrupting the end-users. In one embodiment, the invention provides the ability to "push" software updates to a live cloud account instead of requiring an administrator to install and/or update the extension manually at a predefined schedule.

In accordance with at least one embodiment of the invention, a distributed business data processing system may be multi-tenant, and may include an ability for a developer/user/tenant to extend the functionality and/or operation of one or more components of a common service platform. To provide a suitable management function, the distributed data processing system may include a Cloud Application Extension Manager configured at least to permit a developer to manage and/or administer the availability of an extension to a platform component. For example, a developer may interact with the Cloud Application Extension Manager through one or more of a set of user interfaces that are accessible to users of the platform.

As noted, in some embodiments, the invention may be implemented in the context of a multi-tenant, "cloud" based environment (such as a multi-tenant business data processing platform), typically used to develop and provide services and business applications for end users. This exemplary implementation environment will be described with reference to FIGS. 1-3. However, note that embodiments of the invention may also be implemented in the context of other computing or operational environments or systems, such as for an individual business data processing system, a private network used with a plurality of client terminals, a remote or on-site data processing system, another form of client-server architecture, etc.

FIG. 1 is a diagram illustrating a system 100, including an integrated business system 102 and an enterprise network 104 in which an embodiment of the invention may be implemented. Enterprise network 104 may be associated with a business enterprise, such as a retailer, merchant, service provider, or other type of business. Alternatively, and in accordance with the advantages of an application service provider (ASP) hosted integrated business system (such as a multi-tenant data processing platform), the business enterprise may comprise fewer or no dedicated facilities or business network at all, provided that its end users have access to an internet browser and an internet connection. For simplicity and clarity of explanation, the enterprise network 104 is represented by an on-site local area network 106 to which a plurality of personal computers 108 are connected, each generally dedicated to a particular end user (although such dedication is not required), along with an exemplary remote user computer 110 that can be, for example, a laptop computer or tablet computer of a traveling employee having internet access through a hotel, coffee shop, a public Wi-Fi access point, or other internet access method. The end users associated with computers 108 and 110 may also (or instead) possess an internet-enabled smartphone or other electronic device (such as a PDA) having wireless internet access or other synchronization capabilities. Users of the enterprise network 104 interface with the integrated business system 102 across the Internet 112 or another suitable communications network or combination of networks.

Integrated business system 102, which may be hosted by a dedicated third party, may include an integrated business server 114 and a web interface server 116, coupled as shown in FIG. 1. It is to be appreciated that either or both of the integrated business server 114 and the web interface server 116 may be implemented on one or more different hardware systems and components, even though represented as singular units in FIG. 1. In one embodiment, integrated business server 114 comprises an ERP module 118 and further comprises a CRM module 120. In many cases, it will be desirable for the ERP module 118 to share methods, libraries, databases, subroutines, variables, etc., with CRM module 120, and indeed ERP module 118 may be intertwined with CRM module 120 into an integrated Business Data Processing Platform (which may be single tenant, but is typically multi-tenant).

The ERP module 118 may include (but is not limited to, or required to include) a finance and accounting module, an order processing module, a time and billing module, an inventory management and distribution module, an employee management and payroll module, a calendaring and collaboration module, a reporting and analysis module, and other ERP-related modules. The CRM module 120 may include (but is not limited to, or required to include) a sales force automation (SFA) module, a marketing automation module, a contact list module (not shown), a call center support module, a web-based customer support module, a reporting and analysis module, and other CRM-related modules. The integrated business server 114 (or multi-tenant data processing platform) further may provide other business functionalities including a web store/eCommerce module 122, a partner and vendor management module 124, and an integrated reporting module 130. An SCM (supply chain management) module 126 and PLM (product lifecycle management) module 128 may also be provided. Web interface server 116 is configured and adapted to interface with the integrated business server 114 to provide one or more web-based user interfaces to end users of the enterprise network 104.

The integrated business system shown in FIG. 1 may be hosted on a distributed computing system made up of at least one, but likely multiple, "servers." A server is a physical computer dedicated to run one or more software services intended to serve the needs of the users of other computers that are in data communication with the server, for instance via a public network such as the Internet or a private "intranet" network. The server, and the services it provides, may be referred to as the "host" and the remote computers, and the software applications running on the remote computers, being served may be referred to as "clients." Depending on the computing service that a server offers it could be referred to as a database server, file server, mail server, print server, web server, etc. A web server is a most often a combination of hardware and the software that helps deliver content, commonly by hosting a website, to client web browsers that access the web server via the Internet.

Figure 2:
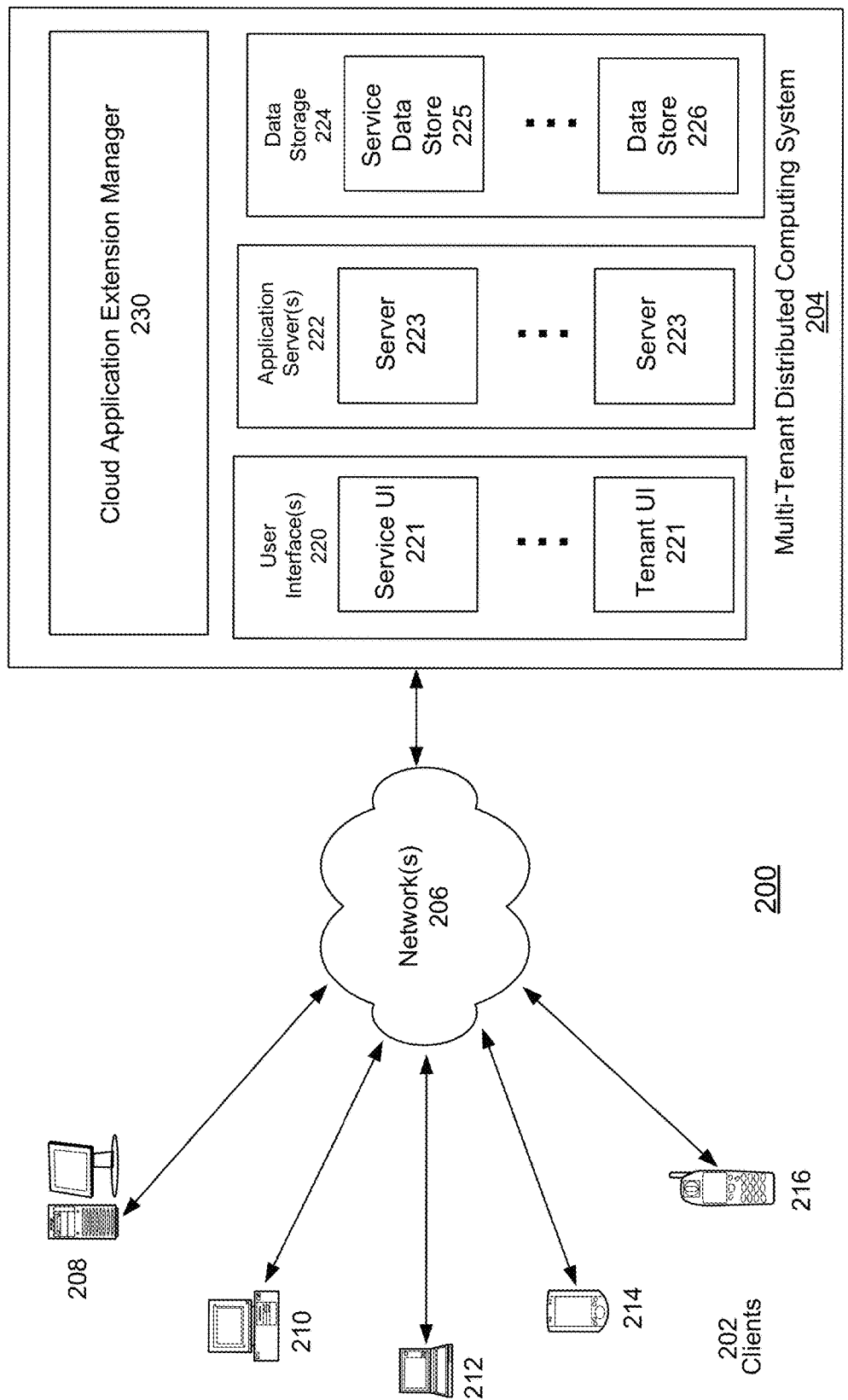
FIG. 2 is a diagram further illustrating elements or components that may be part of a multi-tenant distributed computing system architecture 200, in accordance with at least one embodiment of the invention.

FIG. 2 is a diagram illustrating elements or components of an example operating environment 200 in which an embodiment of the invention may be implemented. As shown in the figure, a variety of clients 202 incorporating and/or incorporated into a variety of computing devices may communicate with a distributed computing service/platform 204 through one or more networks 206. For example, a client may incorporate and/or be incorporated into a client application (e.g., software) implemented at least in part by one or more of the computing devices. Examples of suitable computing devices include personal computers, server computers 208, desktop computers 210, laptop computers 212, notebook computers, tablet computers or personal digital assistants (PDAs) 214, smart phones 216, cell phones, and consumer electronic devices incorporating one or more computing device components, such as one or more electronic processors, microprocessors, central processing units (CPU), or controllers. Examples of suitable networks 206 include networks utilizing wired and/or wireless communication technologies and networks operating in accordance with any suitable networking and/or communication protocol (e.g., the Internet).

The distributed computing service/platform (which may also be referred to as a multi-tenant business data processing platform) 204 may include multiple processing tiers, including a user interface tier 220, an application server tier 222, and a data storage tier 224. The user interface tier 220 may maintain multiple user interfaces 221, including graphical user interfaces and/or web-based interfaces. The user interfaces may include a default user interface for the service to provide access to applications and data for a user or "tenant"

of the service (depicted as "Service UI" in the figure), as well as one or more user interfaces that have been specialized/customized in accordance with user specific requirements (e.g., represented by "Tenant UI" in the figure, and which may be accessed via one or more APIs). The default user interface may include components enabling a tenant or service platform operator to administer the tenant's participation in the functions and capabilities provided by the service platform, such as accessing data, causing the execution of specific data processing operations, etc. Each processing tier shown in the figure may be implemented with a set of computers and/or computer components including computer servers and processors, and may perform various functions, methods, processes, or operations as determined by the execution of a software application or set of instructions. The data storage tier 224 may include one or more data stores, which may include a Service Data store 225 and one or more Tenant Data stores 226.

Each tenant data store 226 may contain tenant-specific data that is used as part of providing a range of tenant-specific business services or functions, including but not limited to ERP, CRM, eCommerce, Human Resources management, financial/accounting, payroll, etc. Data stores may be implemented with any suitable data storage technology, including structured query language (SQL) based relational database management systems (RDBMS).

In some embodiments, the computing system or data processing platform may include a Cloud Application Extension Manager 230, which provides the platform operator and/or tenants with the ability to manage the distribution and maintenance of extensions to applications or other aspects of the platform (such as a user interface, data processing workflow, application functionality, reporting function, security or access control function, etc.). Cloud Application Extension Manager 230 may be configured to permit a developer to manage and/or administer the availability of an extension to a platform component or components. A developer may interact with Cloud Application Extension Manager 230 through one or more of the user interfaces 221 shown in FIG. 2. Platform administrative personnel may also (or instead) interact with an extension or proposed extension to the functionality or capabilities of the platform through one or more of the user interfaces 221 shown in FIG. 2, such as Service UI 221. This may be done to administer the release or upgrade of an extension developed by the platform operator.

In accordance with one embodiment of the invention, distributed computing service/platform 204 may be multi-tenant and service platform 204 may be operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information.

As noted, such business information systems may include an Enterprise Resource Planning (ERP) system that integrates the capabilities of several historically separate business computing systems into a common system, with the intention of streamlining business processes and increasing efficiencies on a business-wide level. By way of example, the capabilities or modules of an ERP system may include: accounting, order processing, time and billing, inventory management, employee management/payroll, and employee calendaring and collaboration, as well as reporting and analysis capabilities relating to these functions. Another business information system that may be provided as part of an integrated service platform is an integrated Customer Relationship Management (CRM) system, which is designed to assist in obtaining a better understanding of customers, enhance service to existing customers, and assist in acquiring new and profitable customers. By way of example, the capabilities or modules of a CRM system may include: sales force automation (SFA), marketing automation, contact list management, call center support, and web-based customer support, as well as reporting and analysis capabilities relating to these functions.

In addition to ERP and CRM functions, a business information system/platform (such as element 204 of FIG. 2) may also include one or more of an integrated partner and vendor management system, eCommerce system (e.g., a virtual storefront application or platform), product lifecycle management (PLM) system, Human Resources management system (which may include medical/dental insurance administration, payroll, etc.), or supply chain management (SCM) system. Such functions or business applications are typically implemented by one or more modules of software code/instructions that are maintained on and executed by one or more servers 223 that are part of the platform's Application Server Tier 222.

Note that both functional advantages and strategic advantages may be gained through the use of an integrated business system comprising ERP, CRM, and other business capabilities, as for example where the integrated business system is integrated with a merchant's eCommerce platform and/or "web-store." For example, a customer searching for a particular product can be directed to a merchant's website and presented with a wide array of product and/or services from the comfort of their home computer or their mobile phone. When a customer initiates an online sales transaction via a browser-based interface, the integrated business system can process the order, update accounts receivable, update inventory databases and other ERP-based systems, and can also automatically update strategic customer information databases and other CRM-based systems. These modules and other applications and functionalities may advantageously be integrated and executed by a single code base accessing one or more integrated databases as necessary, forming an integrated business management system or platform (such as platform 204 of FIG. 2).

As noted with regards to FIG. 1, the integrated business system shown in FIG. 2 may be hosted on a distributed computing system made up of at least one, but typically multiple, "servers." A server is a physical computer dedicated to run one or more software services intended to serve the needs of the users of other computers in data communication with the server, for instance via a public network such as the Internet or a private "intranet" network. The server, and the services it provides, may be referred to as the "host" and the remote computers and the software applications running on the remote computers may be referred to as the "clients."

Rather than build and maintain such an integrated business system themselves, a business may utilize systems provided by a third party (referred to as the platform operator or administrator herein). Such a third party may implement an integrated business system/platform as described above in the context of a multi-tenant platform, wherein individual instantiations of a single comprehensive integrated business system are provided to a variety of tenants. One advantage to such multi-tenant platforms is the ability for each tenant to customize their instantiation of the integrated business system to that tenant's specific business needs or operational methods. Each tenant may be a business or entity that uses the multi-tenant platform to provide business data and functionality to multiple users. Some of those multiple users may have distinct roles or responsibilities within the business or entity. In some cases, a tenant may desire to change or supplement the functionality of an existing platform application or feature by introducing an extension to that application or feature, where the extension is to be made available to the tenant's employees/users and/or the tenant's customers. In some cases an extension may be applied to the processing of the tenant's business related data by altering an existing workflow or creating a new one. The extension may be developed by the platform operator, by the tenant, or by a $3^{rd}$ party developer and then made available to the tenant for installation. The platform may include a "library" or catalog of available extensions, which can be accessed by a tenant and searched to identify an extension of interest. Software developers may be permitted to "publish" an extension to the library or catalog after appropriate validation of a proposed extension.

Figure 3:
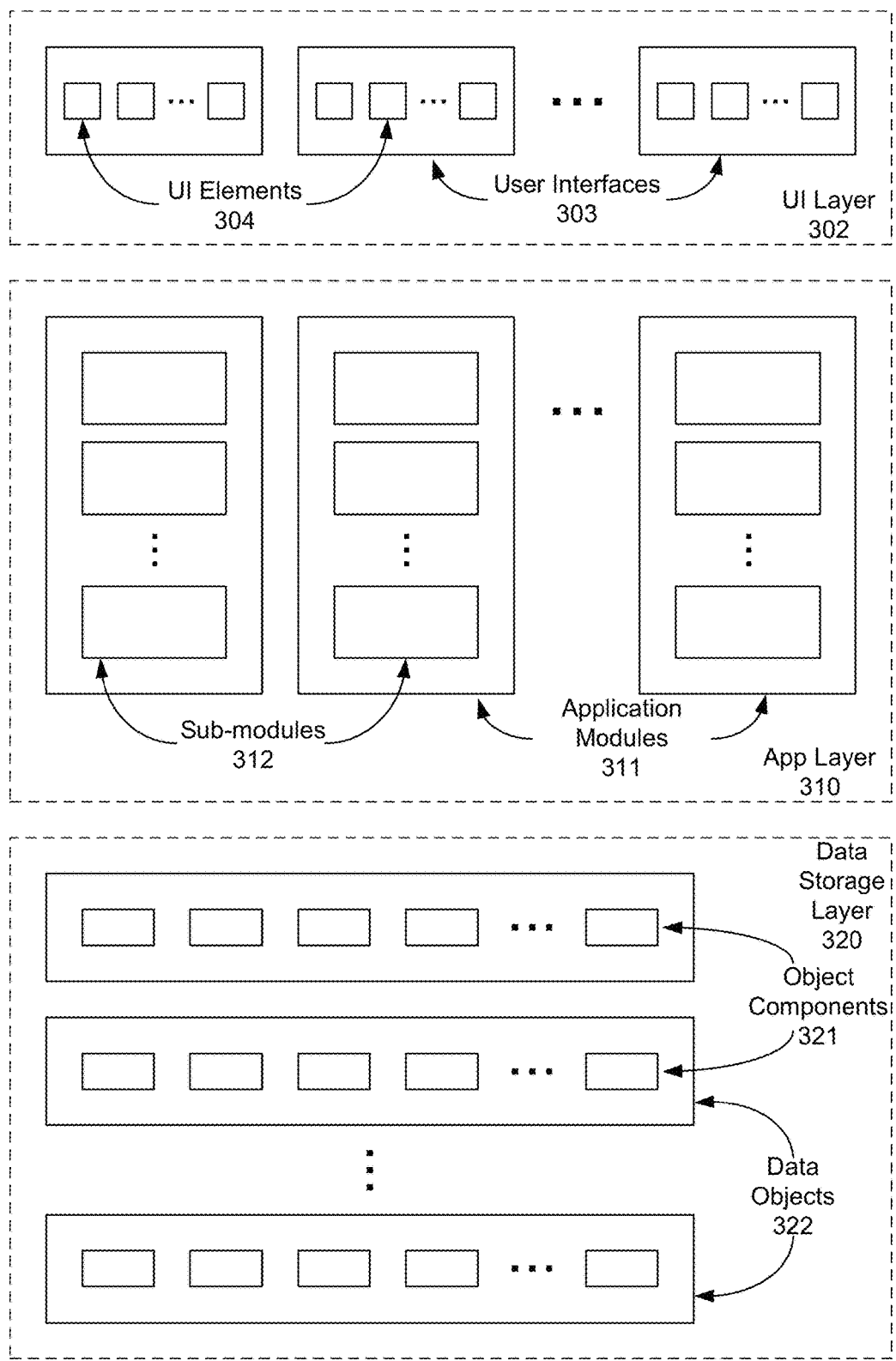
FIG. 3 is a diagram illustrating additional details of the elements or components of the multi-tenant distributed computing service platform of FIG. 2, in which an embodiment of the invention may be implemented.

FIG. 3 is a diagram illustrating additional details of the elements or components of the multi-tenant distributed computing service platform of FIG. 2, in which an embodiment of the invention may be implemented. The software architecture depicted in FIG. 3 represents an example of a complex software system to which an embodiment of the invention may be applied or with which it may be used. In general, an embodiment of the invention may be used in conjunction with a set of software instructions that are designed to be executed by a suitably programmed processing element (such as a CPU, microprocessor, processor, controller, computing device, etc.). In a complex system such instructions are typically arranged into "modules" with each such module performing a specific task, process, function, or operation. The entire set of modules may be controlled or coordinated in their operation by an operating system (OS) or other form of organizational platform.

As noted, FIG. 3 is a diagram illustrating additional details of the elements or components 300 of the multi-tenant distributed computing service platform of FIG. 2. The example architecture includes a user interface layer or tier 302 having one or more user interfaces 303. Examples of such user interfaces include graphical user interfaces and application programming interfaces (APIs). Each user interface may include one or more interface elements 304. For example, users may interact with interface elements in order to access functionality and/or data provided by application and/or data storage layers of the example architecture. Examples of graphical user interface elements include buttons, menus, checkboxes, drop-down lists, scrollbars, sliders, spinners, text boxes, icons, labels, progress bars, status bars, toolbars, windows, hyperlinks and dialog boxes. Application programming interfaces may be local or remote, and may include interface elements such as parameterized procedure calls, programmatic objects and messaging protocols.

The application layer 310 may include one or more application modules 311, each having one or more sub-modules 312. Each application module 311 or sub-module 312 may correspond to a particular function, method, process, or operation that is implemented by the module or sub-module (e.g., a function or process related to providing ERP, CRM, eCommerce or other functionality to a user of the platform). Such function, method, process, or operation may also include those used to implement one or more aspects of the inventive system and methods, such as for implementing aspects, operations, functions, or processes of the Cloud Application Extension Manager 230 of FIG. 2. Such operations or functions may include but are not limited to (or required to include):

Generating a suitable user interface to permit a developer or systems administrator to identify or provide an extension for purposes of installation, un-installation, upgrade or phased release, and one or more user accounts to which the desired action applies;

Performing one or more validation "tests" as needed to determine the condition and acceptability of an extension, revised extension, updated extension, etc.;

Based on the identified extension, determining a status of that extension (installed, previously upgraded, not presently installed, etc.) with regards to each of the one or more specified user accounts; and Generating an appropriate installation, un-installation, upgrade, phased release, roll-back or other form of "path" or process for the extension relative to a specified account or accounts (which may include a different set of operations for one account compared to another based on the type of account, the account status with regards to the extension, etc.).

The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language. Each application server (e.g., as represented by elements 223 of FIG. 2) may include each application module. Alternatively, different application servers may include different sets of application modules. Such sets may be disjoint or overlapping.

The data storage layer 320 may include one or more data objects 322 each having one or more data object components 321, such as attributes and/or behaviors. For example, the data objects may correspond to tables of a relational database, and the data object components may correspond to columns or fields of such tables. Alternatively, or in addition, the data objects may correspond to data records having fields and associated services. Alternatively, or in addition, the data objects may correspond to persistent instances of programmatic data objects, such as structures and classes. Each data store in the data storage layer may include each data object. Alternatively, different data stores may include different sets of data objects. Such sets may be disjoint or overlapping.

Note that the example computing environments depicted in FIGS. 1-3 are not intended to be limiting examples. Alternatively, or in addition, computing environments in which an embodiment of the invention may be implemented include any suitable system that permits users to provide data to, and access, process, and utilize data stored in a data storage element (e.g., a database) that can be accessed directly or remotely over a network, and to which an extension of the functionality or capabilities might be applied. Although further examples below may reference the example computing environment depicted in FIGS. 1-3, it will be apparent to one of skill in the art that the examples may be adapted for alternate computing devices, systems, apparatuses, processes, and environments.

Figure 4:
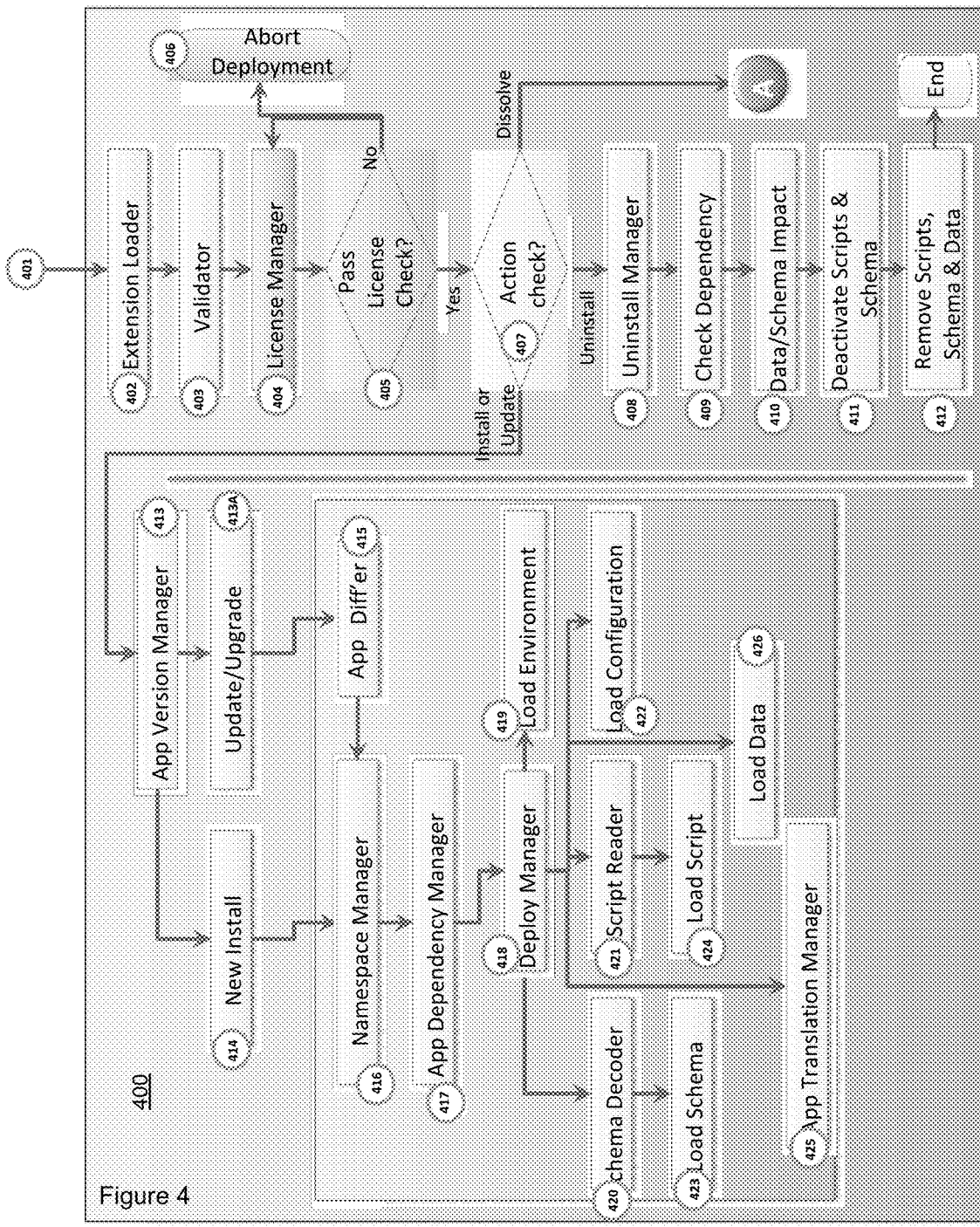
FIG. 4 is a flow chart or flow diagram illustrating a process, method, operation, or function for deployment of an extension to the functionality of a multi-tenant distributed computing service platform, and that may be used when implementing an embodiment of the invention.

FIG. 4 is a flow chart or flow diagram illustrating a process, method, operation, or function for deployment of an extension to the functionality of a multi-tenant distributed computing service platform, and that may be used when implementing an embodiment of the invention. The figure illustrates aspects of an exemplary processing flow that may be implemented by the inventive Deployment Engine 400.

As shown in the figure, once a command to install an extension (at step or stage 401) is received by engine 400, it loads the extension file into memory (step or stage 402). The contents are passed through a validator (step or stage 403) to ensure the integrity of the extension. At this stage, the engine will read the files contained in the extension to ensure that the referenced/dependent objects and/or their internal properties are either available as part of the extension itself or are accessible in the tenant account space. Depending on the configuration of the deployment engine, missing files/objects/properties may cause the system to abort the install/update process. If the extension is successfully validated, it is stored in a specific folder in the system's data storage.

The extension is then checked for conditions or constraints on its use by others, typically by a license manager process (step or stage 404). At this stage the deployment engine will determine if the target account space has the necessary license/permissions to install the extension or upgrade to the new version of the extension. If the account satisfies a license check with regards to the extension (corresponding to the "Yes" branch of stage or step 405), then the requested action (to install/upgrade) is performed (stage or step 407). If the account fails to satisfy the license check (corresponding to the "No" branch of stage or step 405), then the deployment is typically aborted/terminated (step or stage 406).

At stage or step 407 the requested action is initiated. These may include (but are not limited to including, or required to include):

Uninstall (illustrated by the sequence beginning at stage or step 408): The extension is passed to the Uninstall manager (at step 408) to determine the next course of action. This process checks for object as well as data dependencies (at step 409) that may have to be removed from the tenant account space as part of the installation or upgrade, followed by analysing the impact on the underlying schema as well as data (at step 410), if any. The deployment engine may also prepare a plan consisting of a list of objects and data records that must be removed as part of the installation or upgrade. Before actually removing the objects/data from the tenant account space, the uninstall manager may deactivate scripts, customization objects, and mark data records inactive (at step 411) to prevent any use of the functionality provided by the extension that is being uninstalled. This ensures that the users of the extension do not experience a breakdown in the functionality while using the cloud application. Finally, the deployment engine will process the actual removal of all the objects (including files) from the target account (at step 412);

Install/Update: For this action, the extension passes through a separate process. First, the version is checked (at step 413) for the extension that is being processed for the target account. Depending on the state of the account (e.g., whether a prior version of the extension is installed in the target account), the action will be either an Upgrade/Update action (at step 413A) or a New Install (at step 414). Typically, the application version information is part of the extension manifest file. The deployment engine will look at the version information in the incoming manifest file for the extension and compare it to that of the currently installed version (if there is a currently installed version). In the case of an Upgrade/Update, the extension will first pass through a "diff" utility (illustrated as "App Diff'er", at step 415) to determine what has been changed in the incoming extension version as compared to what is already installed in the target account. The deployment engine may first prepare a plan for the currently installed objects/properties and then compare it with a plan of the incoming objects/properties.

Note that the flow of execution from that point is similar to that of a "New Install" action. The extension is parsed for the use of namespaces (at step 416); this is done to ensure that the incoming objects match with the publisher's namespaces. Any namespace(s) that do not belong to the publisher are passed to the dependency manager (at step 417) to evaluate the extension to determine internal as well as external dependencies. Once the dependent objects are available, the execution flows through to the deploy manager (at step 418) where the deploy plan is prepared and the individual components of the extension are handled as follows:

the environment (at step 419) and/or configuration (at step 422) are prepared as per the needs of the extension;

the files (scripts, resources, etc.) are copied to the appropriate folders in the data storage element (at steps 421 and 424);

the Schema files are processed and the customizations are loaded into the account (at steps 420 and 423);

the translations, if any, are applied (at step 425); and the migrate scripts, if any, are processed to load data (at step 426).

Dissolve: The extension passes through a standard dissolution process. This is typically controlled by a suitable separate process (as illustrated by Process A in the figure). As part of this process, the deployment engine will identify a dissolution plan, which consists of a list of objects that need to be dissolved. This is based on the extension version that is currently installed in the tenant account space. The engine then removes the extension installation related files (but not the objects, scripts properties or any data), including the manifest file.

Rollback: Note that the release definition enables the extensions administrator/manager to perform a rollback on the upgraded/installed extension, wherein the system compares the current version of the installed extension (or the one that is in progress) that needs to be rolled back (i.e., back to the prior stable version) to that of the previous stable version and defines a rollback plan. Such a plan would typically consist of the changes that need to be made in the tenant environment/system such that there are no components (including data) from the newer version of the extension and that scripts are rolled back to their previous version.

Figure 5:
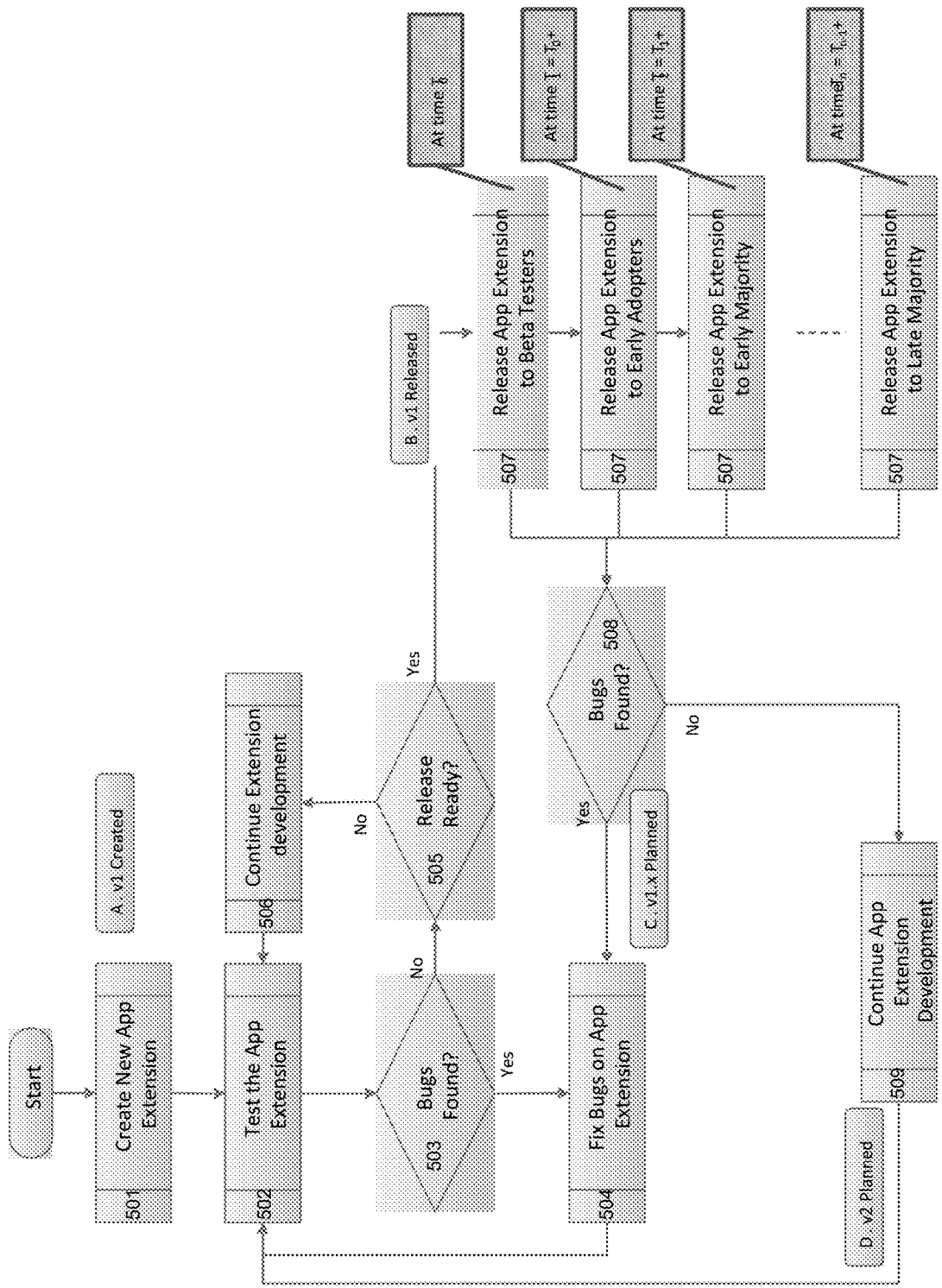
FIG. 5 is a flowchart or flow diagram illustrating the steps or stages of a process, function, operation, or method of implementing a phased release of an extension to an application residing on a multi-tenant data processing platform.

Note that in some embodiments, release of an extension to the functionality or capabilities of a multi-tenant platform may be performed by one of several release paths, depending on the development stage of an extension and/or the management objectives of the developer or platform manager. For example, FIG. 5 is a flowchart or flow diagram illustrating the steps or stages of a process, function, operation, or method of implementing a multi-phase release of an extension to an application residing on a multi-tenant data processing platform. This form of release may be one of those made available to an extension release or platform manager after completion of one or more of the steps or stages described with reference to FIG. 4, and/or when the new version of the extension is made generally available (which typically entails uploading the extension to the central repository and modifying the release definition to indicate the availability of a new version of the extension). Using the release definition and a pre-defined list of recipients at each phase a platform administrator may automate the phase-release process for the extension in whole or in part. When release phase X starts (at stage 507) the request to upgrade a tenant account space is sent to the deployment engine at 401. In one embodiment, this request consists of the following parameters:

Target account space identifier;
Extension Identifier; and
Extension version.

This aspect of the invention enables an extension developer to release their extension(s) in a phased mode, for example by making a new version of the extension available to early adopters (or to a sub-set of the entire customer population) and then slowly share the extension with the rest of the customer base in a gradual and progressive release or roll-out. This aspect of the invention also allows the developer of the extension to perform bug/error identification and fix work in parallel with regular application development on newer versions of the extension. The bug identification and fixes may be applied to an older version of the extension in an attempt to support an existing customer base that for one reason or another prefers to not upgrade to the latest version of the application extension. A bug fix version of the extension is released (a process of uploading to the central repository and updating the release definition) in the same way as other versions. Fix/patch version are contained within the extension definition file and driven by the definition in the manifest & build files.

In one embodiment, a phased release management process may involve one or more of the following elements or functional modules:

Phased Release UI: an extension developer/platform administrator has access to a UI wherein they can individually or by group select the recipients for a given version of the extension. To improve the predictability of the upgrade (push), the Administrator may also set a schedule for each recipient for when their accounts should be updated. The UI may be modified to manage customer messaging such that once the schedule is created, the customer is notified (in-account, email, SMS, etc.) about the "Upcoming upgrade" (including the time window when the upgrade will happen), and later is sent a notification when the upgrade starts and when it is completed (i.e., success or failure) with the appropriate details. These processes can be automated using the UI and thereby assist the release administrators in streamlining the extension release process and increase the predictability for customers. Note that these features can be customized for each customer: starting from schedule, messaging, to the actual upgrades and final notifications;

Consumer Side (App Pull): Consumers/users of cloud application extensions are able to see a list of available upgrade-to versions that they may select and access. This is based on the currently installed version of the extension in their account. A platform operator may permit publishers to keep multiple versions of an extension alive concurrently. This enables the extension developers to maintain older versions and provide bug-fixes, and also provides more time for customers to upgrade to the latest stable versions; and Publisher side (App Push): An application developer/platform administrator is able to maintain more than one active version of their extension. They may decide to release additional bug fixes on an older version of an extension while they continue to develop newer versions with new functions and capabilities. This allows a publisher to release a new version to a select set of recipients as an Alpha or Beta release and continue to do select recipients of releases thereafter while developing the new version.

Note that embodiments of the invention are of particular value in a multi-tenant environment/system because the invention allows different tenants to be able to run and benefit from a different version of an extension and its functionalities, without interfering with another tenant registered with or using the platform. The invention thus provides mechanisms and processes to enable the platform to provide multiple permutations and combinations of a base multi-tenant application and one or more related extensions or sets of added functionality.

Note that this capability is not necessary for standard software applications that are installed in a single tenant setting. This is because in such an environment there is no need to support concurrent versions of the application or the extensions. Instead, a single standalone application may have any version of the extensions (or plugins) installed manually or remotely without the need to for it to be a part of a phased release, which may be needed in the case of a multi-tenant system. It is therefore important for the Extension Release Manager of the invention to take into account the target tenant account and the version of the extension installed for that tenant. Because an extension may have dependencies with respect to other extensions (and with respect to a specific version), the extensions validator element in FIG. 4 is configured to perform a check for every combination of versions that are installed in any of the tenant environments/system.

As shown in FIG. 5, in this example, a Cloud Application Extension (the "extension") development lifecycle begins when a first version (v1) is created using an appropriate software development environment or tool (illustrated as step 501 in the figure). The extension moves through a testing process (illustrated as step 502), an error ("bug") detection process (illustrated as step 503), a bug-fixing process (if needed, and illustrated as step 504), a release check process (illustrated as step 505), a continued development stage (if needed, and illustrated as step 506), and into a release/deployment process (illustrated as step 507). The v1 (version 1) of the extension is released at time $T_0$ to one or more sets or groups of tenants/users (identified as "beta testers", "early adopters", etc. in the figure).

In a multi-phase release cycle, the v1 of the extension goes through more than one phase of its release, with each phase resulting in a release to a set or group of tenants/users. These are illustrated as (step 507) in the figure and may occur over a period of time $T_0$ through $T_n$. If at any step 507 a bug is encountered (as illustrated at step 508), then a fix (for example, a revised or updated version v1.x of the extension) is developed, tested, and prepared for release. The fixes (i.e., patches, updates, etc.) are applied to all those customers who have received the base version of the extension (v1). Customers who are yet to receive the base version do not receive the fix (v1.x). If no "bugs" are identified during the phased release, then the developers may initiate creation of the next major version of the extension (e.g., illustrated as version v2, at step 509). At this point the extension development and release lifecycle iterates from step 509 back to step 502 and the development is carried out for the new version (in this case v2). In many cases, this means that the developer and the platform will have two major versions of an extension being developed/fixed simultaneously.

Figure 6:
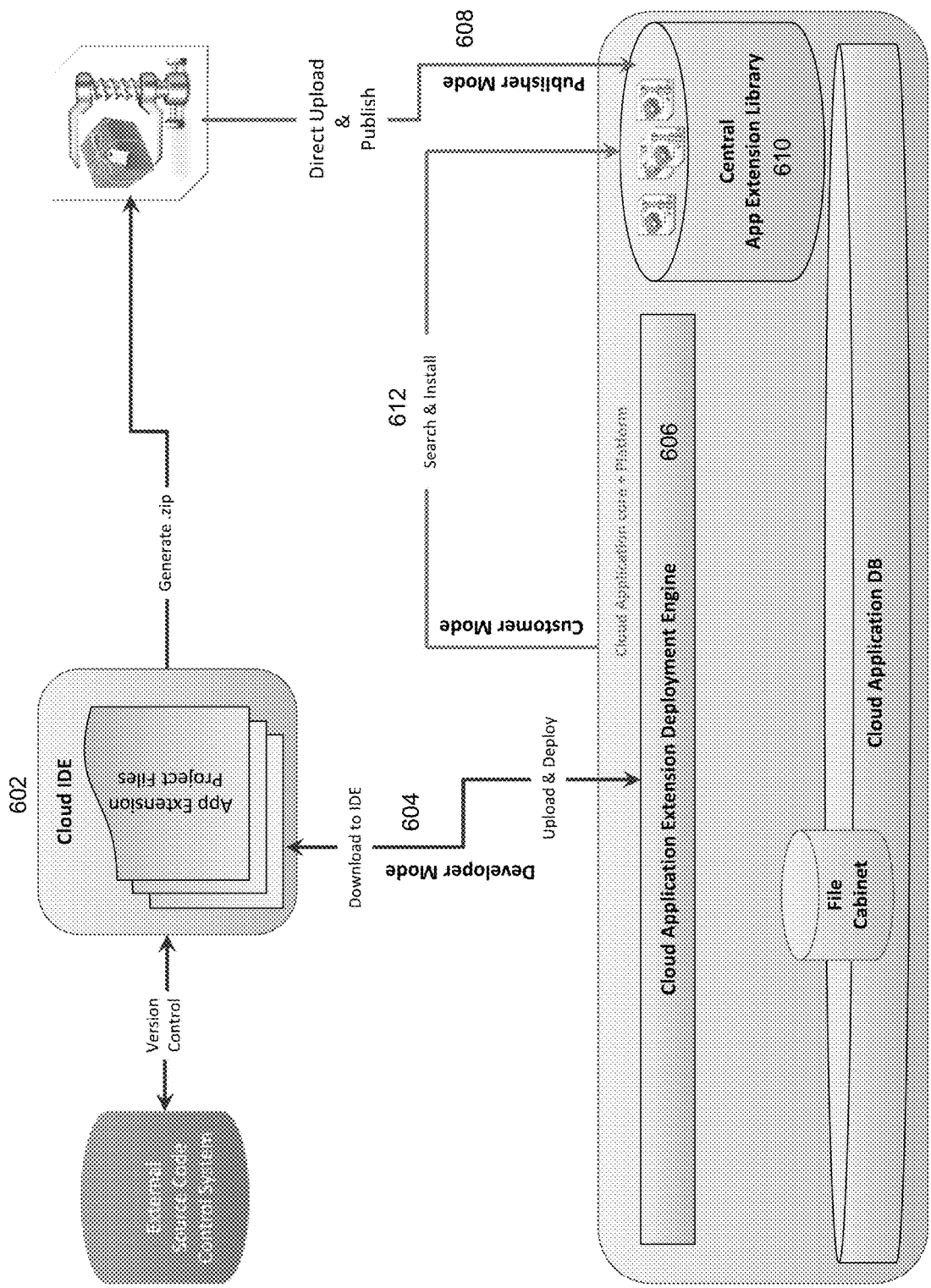
FIG. 6 is a diagram illustrating elements and processes that may be used in implementing an embodiment of the invention that operates to permit an extension developer to create an extension, submit the extension to a platform for acceptance and storage, permit users to search for and select the extension, and deploy the extension to the user.

FIG. 6 is a diagram illustrating elements and processes that may be used in implementing an embodiment of the invention that operates to permit an extension developer to create an extension, submit the extension to a platform for acceptance and storage, permit users to search for and select the extension, and deploy the extension to the user. As shown in the figure, a developer may code and assemble a logical collection of customization elements 602, including but not limited to (or required to include) definitions for custom records, scripts, reports, etc., as well as resource files and migration scripts. These elements are defined in their respective individual files that together make an application extension. When the developer intends to test the application, it is deployed to a developer account (which is equivalent to a development environment) 604. In order to deploy the application extension, it is uploaded to the developer account. Once the upload of the application extension is completed, the "Deploy" command is executed and the deployment engine (described with reference to FIG. 4) takes over control 606.

If the validation and/or other relevant tests are successfully completed, then the developer may choose to publish the application extension 608 to the external facing repository 610, thereby enabling customers to download and install the extension into their account 612. In some cases (such as where the target account belongs to the development team) the system may provide a means to download the source code, which then supports parallel, multi-developer, multi-functional application extension development.

A customer may perform a search 612 on the extension repository 610 to locate and subsequently update/install an application extension from the repository. The repository store is a central data storage element and is the single source of "truth" for the released/published application extensions. It is here that the release definition resides (1 per application extension), which controls how an extension is upgraded, rolled-back, etc. in a target account.

Note that in a conventional non-platform setting, the phased updates are applied at the database level. This means that all accounts of a company that are residing in a shared database will be upgraded to the next version of the base application. In contrast, by using an embodiment of the invention, the release process and access control is more granular and can be exercised down to the individual account level.

Figure 7:
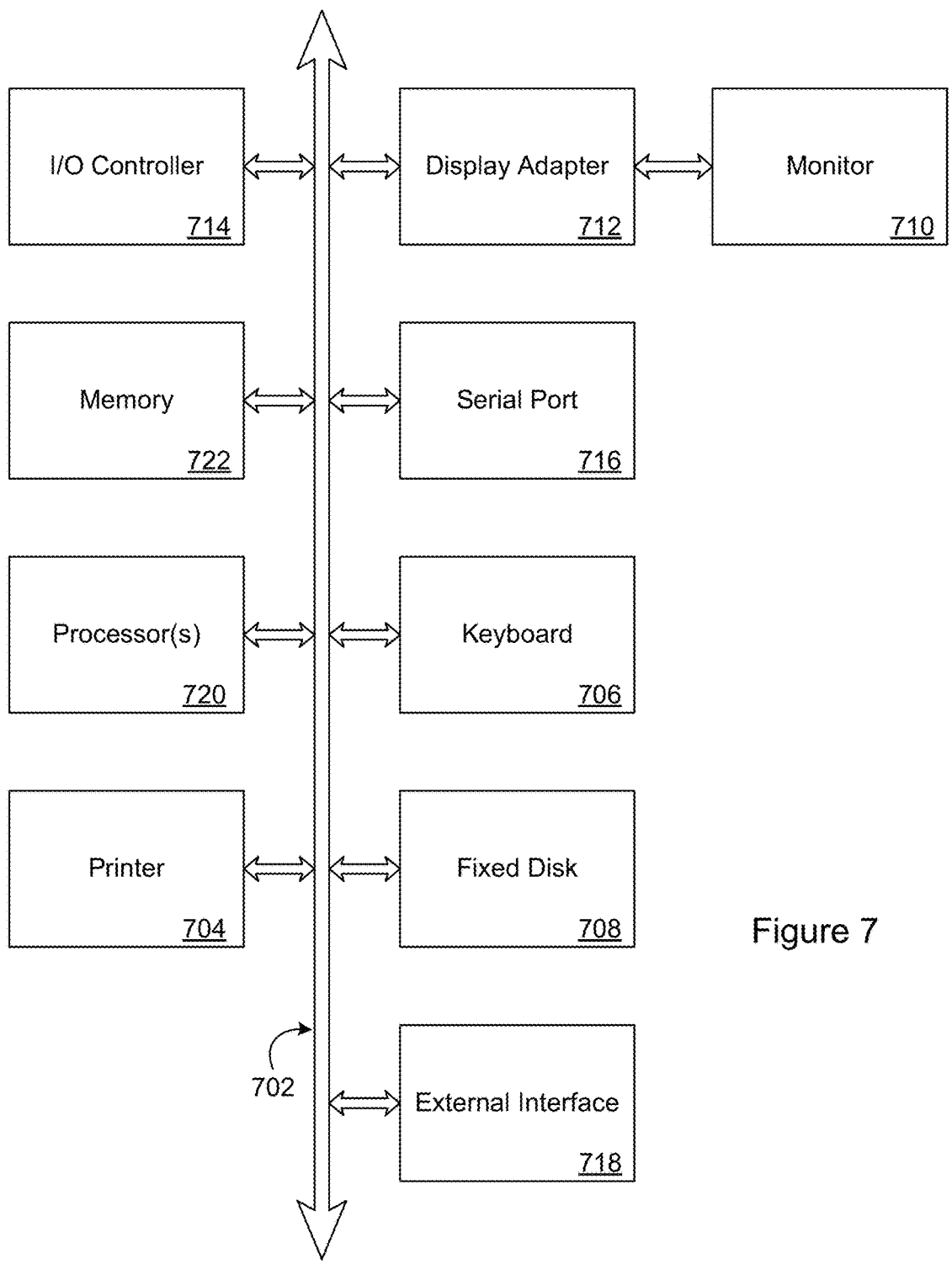
FIG. 7 is a diagram illustrating elements that may be present in a computer device and/or system configured to implement a method, operation, function, and/or process in accordance with some embodiments of the present invention.

In accordance with at least one embodiment of the invention, one or more aspects, elements, or components of inventive the system, apparatus, methods, functions, processes, and/or operations may be wholly or partially implemented in the form of a set of instructions executed by one or more programmed computer processors such as a central processing unit (CPU), controller, server, or microprocessor. Such a processor may be incorporated in an apparatus, server, client or other computing device operated by, or in communication with, other components of the system. As an example, FIG. 7 is a diagram illustrating elements that may be present in a computer device and/or system 700 configured to implement a method, operation, function, and/or process in accordance with some embodiments of the present invention. The subsystems shown in FIG. 7 are interconnected via a system bus 702. Additional subsystems include a printer 704, a keyboard 706, a fixed disk 708, and a monitor 710, which is coupled to a display adapter 712. Peripherals and input/output (I/O) devices, which couple to an I/O controller 714, can be connected to the computer system by any number of means known in the art, such as a serial port 716. For example, the serial port 716 or an external interface 718 can be utilized to connect the computer device 700 to further devices and/or systems not shown in FIG. 7, including a wide area network such as the Internet, a mouse input device, and/or a scanner. The interconnection via the system bus 702 allows one or more processors 720 to communicate with each subsystem and to control the execution of instructions that may be stored in a system memory 722 and/or the fixed disk 708, as well as the exchange of information between subsystems. The system memory 722 and/or the fixed disk 708 may embody a tangible computer-readable medium.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components, processes, data processing operations, methods, or functions described in this application may be implemented as software code to be executed by a suitably programmed processor using any suitable computer language such as, for example, Java, JavaScript, C++ or Perl using, for example, procedural, object oriented and/or functional programming techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

What is claimed is:

1. A multi-tenant data processing system, comprising:
one or more processors configured to execute one or more business related data processing applications installed in the system and accessible by a plurality of tenants of the multi-tenant data processing system;
a data storage element accessible by a plurality of tenants of the multi-tenant data processing system; and
a platform extension manager executable by the one or more processors and configured to permit a user to control a process for an extension to an element of the multi-tenant data processing system, the platform extension manager configured to:
generate a user interface configured to:
receive an identification of an extension or an upgrade to an extension to the element of the multi-tenant data processing system from the user, the extension or the upgrade to the extension corresponding respectively to each of one or more tenants of the multi-tenant data processing system;
receive an identification of a version of the extension or a version of the upgrade to the extension to the element of the multi-tenant data processing system from the user;
receive from the user an identification of one or more accounts associated with one or more tenants of the multi-tenant data processing system to which the selected action is to be applied, the identification of the one or more accounts excluding at least one of the tenants of the multi-tenant data processing system, wherein each account has different sets of actions; and
based on the identified account, receive from the user a selection of an action to be applied to the identified version of the extension or to the identified version of the upgrade to the extension;
perform one or more validation tests as needed to determine the acceptability for performing the selected action on the identified version of the extension or the identified version of the upgrade to the extension;
based on the received identification of the extension or the upgrade to the extension, the received identification of the version of the extension or the version of the upgrade to the extension, and the received identification of one or more accounts, determine a status of installed, upgraded, rollback or not installed for applying the action to the version of the extension or the version of the upgrade corresponding to each of the one or more identified accounts, the status of the version of the extension or the version of the upgrade indicated in the user interface;
determine a deployment process configured to achieve the selected action for the version of the extension or for the version of the upgrade based on the determined status for the version of the extension or the version of the upgrade corresponding to each of the one or more identified accounts;
receive from the user a command to implement the deployment process; and implement the deployment process.

2. The multi-tenant data processing system of claim 1, wherein the business related data processing applications installed in the system include one or more of an enterprise resource planning (ERP), a customer relationship management (CRM), or an eCommerce application.

3. The multi-tenant data processing system of claim 1, wherein the extension to the element of the multi-tenant data processing system is one of an extension to a user interface, an extension to one of the business related data processing applications installed in the system, or an extension to a reporting function of the multi-tenant data processing system.

4. The multi-tenant data processing system of claim 1, wherein the user selected action is one of a validation operation, an installation operation, an un-install operation, an update operation, and a roll-back operation.

5. The multi-tenant data processing system of claim 1, wherein the deployment process further comprises a first deployment process applicable to a first account and a second deployment process applicable to a second account.

6. An apparatus for operating a multi-tenant data processing system, comprising:
an electronic data processing element;
a set of instructions stored on a non-transient medium and executable by the electronic data processing element, which when executed cause the apparatus to:
generate a user interface configured to:
receive an identification of an extension or an upgrade to an extension to the element of the multi-tenant data processing system from the user, the extension or the upgrade to the extension corresponding respectively to each of one or more tenants of the multi-tenant data processing system;
receive an identification of a version of the extension or a version of the upgrade to the extension to the element of the multi-tenant data processing system from the user;
receive from the user an identification of one or more accounts associated with one or more tenants of the multi-tenant data processing system to which the selected action is to be applied, the identification of the one or more accounts excluding at least one of the tenants of the multi-tenant data processing system, wherein each account has different sets of actions; and
based on the identified account, receive from the user a selection of an action to be applied to the identified version of the extension or to the identified version of the upgrade to the extension;
perform one or more validation tests as needed to determine the acceptability for performing the selected action on the identified version of the extension or the identified version of the upgrade to the extension;
based on the received identification of the extension or the upgrade to the extension, the received identification of the version of the extension or the version of the upgrade to the extension, and the received identification of one or more accounts, determine a status of installed, upgraded, rollback or not installed for applying the action to the version of the extension or the version of the upgrade corresponding to each of the one or more identified accounts, the status of the version of the extension or the version of the upgrade indicated in the user interface;

determine a deployment process configured to achieve the selected action for the version of the extension or for the version of the upgrade based on the determined status for the version of the extension or the version of the upgrade corresponding to each of the one or more identified accounts;

receive from the user a command to implement the deployment process; and implement the deployment process.

7. The apparatus of claim 6, wherein the user selected action is one of a validation operation, an installation operation, an un-install operation, an update operation, and a roll-back operation.

8. The apparatus of claim 6, wherein the extension to the element of the multi-tenant data processing system is one of an extension to a user interface, an extension to one of the business related data processing applications installed in the system, or an extension to a reporting function of the multi-tenant data processing system.

9. The apparatus of claim 6, wherein the deployment process further comprises a first deployment process applicable to a first account and a second deployment process applicable to a second account.

10. A method of operating a multi-tenant data processing system, comprising:

providing a platform extension manager configured to permit a user to control a process for an extension to an element of the multi-tenant data processing system, the platform extension manager configured to:

generate a user interface configured to:

receive an identification of an extension or an upgrade to an extension to the element of the multi-tenant data processing system from the user, the extension or the upgrade to the extension corresponding respectively to each of one or more tenants of the multi-tenant data processing system;

receive an identification of a version of the extension or a version of the upgrade to the extension to the element of the multi-tenant data processing system from the user;

receive from the user an identification of one or more accounts associated with one or more tenants of the multi-tenant data processing system to which the selected action is to be applied, the identification of the one or more accounts excluding at least one of the tenants of the multi-tenant data processing system, wherein each account has different sets of actions; and based on the identified account, receive from the user a selection of an action to be applied to the identified version of the extension or to the identified version of the upgrade to the extension;

perform one or more validation tests as needed to determine the acceptability for performing the selected action on the identified version of the extension or the identified version of the upgrade to the extension;

based on the received identification of the extension or the upgrade to the extension, the received identification of the version of the extension or the version of the upgrade to the extension, and the received identification of one or more accounts, determine a status of installed, upgraded, rollback or not installed for applying the action to the version of the extension or the version of the upgrade corresponding to each of the one or more identified accounts, the status of the version of the extension or the version of the upgrade indicated in the user interface;

determine a deployment process configured to achieve the selected action for the version of the extension or for the version of the upgrade based on the determined status for the version of the extension or the version of the upgrade corresponding to each of the one or more identified accounts;

receive from the user a command to implement the deployment process; and implement the deployment process.

11. The method of claim 10, wherein the extension to the element of the multi-tenant data processing system is one of an extension to a user interface, an extension to a business related data processing application installed in the system, or an extension to a reporting function of the multi-tenant data processing system.

12. The method of claim 10, wherein the deployment process further comprises a first deployment process applicable to a first account and a second deployment process applicable to a second account.

13. The method of claim 11, wherein the business related data processing application installed in the system include one or more of an enterprise resource planning (ERP), a customer relationship management (CRM), or an eCommerce application.

* * * * *